United States Patent [19]

Corbeil et al.

[11] Patent Number: 4,482,123
[45] Date of Patent: Nov. 13, 1984

[54] SUPPORT DEVICE FOR A FIRE EXTINGUISHER

[75] Inventors: Romain Corbeil, Ste-Rose; Jacques Faubert, Ste-Thérèse; Marcel Trudeau, Montreal, all of Canada

[73] Assignee: Hydro Quebec, Montreal, Canada

[21] Appl. No.: 350,258

[22] Filed: Feb. 19, 1982

[30] Foreign Application Priority Data

Jul. 24, 1981 [CA] Canada .................................. 382551

[51] Int. Cl.³ ............................................. A01K 97/10
[52] U.S. Cl. .................................... 248/542; 169/51; 248/222.1
[58] Field of Search ...................... 248/542, 543, 221.3, 248/222.1, 304, 551, 553; 24/371, 241 SB, 233; 292/306; 169/51; 220/86 NR; 70/59, 61; 116/202

[56] References Cited

U.S. PATENT DOCUMENTS

| | | | |
|---|---|---|---|
| 1,129,198 | 2/1915 | Iddings | 248/551 |
| 1,226,968 | 5/1917 | Guenther | 248/551 |
| 1,337,234 | 4/1920 | Kopf | 248/551 |
| 1,546,208 | 7/1925 | Cunningham | 24/241 SB |
| 1,949,608 | 3/1934 | Johnson | 24/241 SB |
| 2,705,357 | 4/1955 | Davick | 24/241 SB |
| 2,910,262 | 10/1959 | Haessler | 248/304 |
| 4,010,967 | 3/1977 | Renteria | 116/202 |
| 4,050,730 | 9/1977 | Tada et al. | 24/241 SB |

FOREIGN PATENT DOCUMENTS 210755 11/1907 Fed. Rep. of Germany ........ 169/51

Primary Examiner—William H. Schultz
Assistant Examiner—Ramon O. Ramirez
Attorney, Agent, or Firm—Schwartz, Jeffery, Schwaab, Mack, Blumenthal & Koch

[57] ABSTRACT

A support device for a fire extinguisher of the type comprising a rigid hook on which the fire extinguisher is hung. The device is provided with a spring-operated, safety latch which prevents access to the hook by closing a groove in the hook as soon as the fire extinguisher is removed to prevent the fire extinguisher from being hung after having been used. A key is provided to allow only a few authorized persons to rehang or, if necessary, replace the removed extinguisher. This device controls the utilization and the condition of the fire extinguisher in a much more efficient and, accordingly, safer manner. If desired, the device can also be provided with a micro-switch connected to a control circuit to immediately advise those in charge of building safety as soon as a fire extinguisher has been removed from its hook.

8 Claims, 4 Drawing Figures

SUPPORT DEVICE FOR A FIRE EXTINGUISHER

BACKGROUND OF THE INVENTION

1. Field of the Invention

The present invention relates to a support device for a fire extinguisher, of the type comprising a rigid hook on which the fire extinguisher is hung.

2. Description of the Prior Art

As is well known, fire extinguishers which are used in most industrial, commercial or individual buildings as essential safety features are hung by hooks fixed to the walls. This type of support allows anyone to easily reach and remove the fire extinguisher in the event it is needed, but it has the inherent drawback of permitting the person having once used the fire extinguisher to rehang it after use. The disadvantage of this is that the fire extinguisher may not have been completely used and is near empty, or it may be empty and may simply have been rehung through inadvertance. In both cases, such rehanging of the fire extinguisher can be particularly dangerous since a so-rehung fire extinguisher may be empty or near empty and, therefore, inoperative when again needed.

As a matter of fact, various experiments have shown that when a fire extinguisher is removed from its support for putting out a fire, the person who uses it almost always hangs it again on its support without verifying its internal pressure, and thus makes it dangerous for subsequent use. This occurs even if the fire extinguisher is the type provided with a meter indicating its internal pressure and, therefore, permitting those in charge of maintenance to determine whether or not it must be recharged if discovered.

SUMMARY OF THE INVENTION

The object of the present invention is to provide a fire extinguisher support which overcomes the above mentioned drawback.

More particularly, the object of the present invention is to provide a device for supporting a fire extinguisher which can be used in any kind of building having a plurality of fire extinguishers and where it is difficult to verify whether or not a particular fire extinguisher has been used.

In accordance with the present invention, this object is achieved by a support device of the above-mentioned type which incorporates means for preventing access to the hook on which the fire extinguisher is hung as soon as the fire extinguisher is removed, thus eliminating the possibility of rehanging an empty or partially empty extinguisher.

Advantageously, the fire extinguisher supporting device according to the invention is provided with a special key necessary for providing access to the hook after the fire extinguisher has been removed in order to hang it again or to hang another fire extinguisher. This particular arrangement obliges the person who uses the fire extinguisher to bring it to someone in charge of building safety or to abandon this fire extinguisher on the floor, which permits those responsible for building safety to recover it and verify whether ir has been used and must be refilled.

In essence, the device for supporting a fire extinguisher according to the instant invention comprises a rigid hook on which the extinguisher is hung. This support device is characterized in that it further comprises means for preventing access to the hook as soon as the fire extinguisher is removed so as to avoid the so removed fire extinguisher from being rehung.

The rigid hook has a groove, and the fire extinguisher is hung by a ring inserted in this groove. The means for preventing access to the hook preferably comprises, in combination:

a latch;

means for moving the latch across the groove to block the opening of the groove as soon as the support ring of the fire extinguisher is removed from the groove; and means for locking the latch as soon as the latch has been moved across the groove of the hook.

Preferably, the latch moving means comprises a pressure-spring mounted so as to push the latch across the groove as soon as one end of the latch is no longer held by the ring of the fire extinguisher. Similarly, the latch locking means preferably comprises a rod held under pressure by a spring and mounted so as to block the latch as soon as it extends over the groove and thus block the groove opening.

In accordance with a particularly advantageous embodiment of the invention, the abovedescribed fire extinguisher supporting device further comprises a key for removing the blocking rod from the latch and tightening its pressure-spring again. The removal of this rod allows withdrawal of the latch from the groove by pulling the latch against its pressure-spring to rehang the fire extinguisher or to hang another fire extinguisher.

In accordance with another advantageous embodiment of the invention, control means such as a microswitch can be associated with the means for preventing access to the hook in order to emit a signal to a control panel as soon as the fire extinguisher is removed from its support hook.

According to a particularly advantageous embodiment of the invention, the device for supporting a fire extinguisher comprises a rigid hook provided with a groove on which is hung the fire extinguisher by means of a ring inserted in the groove. A housing forms an integral part of the hook, and a latch is mounted about a pin extending parallel to the groove of the hook inside the housing. The latch is pivotable about the pin from a first position in which it is adjacent the hook and it completely frees the groove thereof, to a second position in which the latch is separated from the hook and prevents access because it extends over the groove and closes it. The latch is of such a length that one of its ends comes into contact with the ring of the fire extinguisher when the same is hung on the hook, and is held by this ring in the first position.

A first pressure-spring is mounted inside the housing for permanently urging the latch and pivoting it about the pin so that it moves it to its second position as soon as the latch is no longer held in the first position by the ring of the fire extinguisher.

A blocking rod is mounted inside the housing and movable from a first non-engaging position in which the rod is in contact with the latch and held by the same without preventing its rotation, to a second engaging position in which the rod engages the latch and blocks the same. The first non-engaging and second engaging positions of the rod correspond to the first and second positions of the latch, respectively.

A second pressure-spring is mounted inside the housing for permanently urging the blocking rod and moving it into engaging position with respect to the latch as soon as the latch has reached its second position.

Last of all, a key is provided which is insertable into the housing through a hole for disengaging the blocking rod from the latch by action against the pressure exerted by the second spring when the rod is in its second position in which it engages the latch. This removal of the blocking rod then allows the latch to move back to its first position by applying an external pressure against the pressure exerted by the first spring and thus to free the groove of the hook in order to permit hanging the fire extinguisher again and/or hanging another fire extinguisher.

BRIEF DESCRIPTION OF THE DRAWINGS

The invention and its advantages will be better understood with reference to the following description of a preferred embodiment thereof and the accompanying drawings wherein.

DETAILED DESCRIPTION OF A PREFERRED EMBODIMENT

Figure 1:
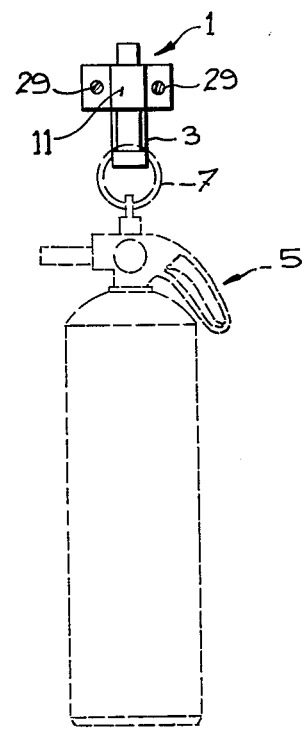
FIG. 1 is a front elevation view of a support device according to the invention.

A fire extinguisher supporting device 1 shown in the drawings comprises a hook 3 to which is hung a fire extinguisher 5, either directly when the fire extinguisher has some attachment means or, as shown, via an attachment ring 7. The hook 3 is rigidly fixed to the wall of the building in which the fire extinguisher 5 must be available, by means of a plurality of screws 29 or any similar means, as shown on FIG. 1.

Figure 2:
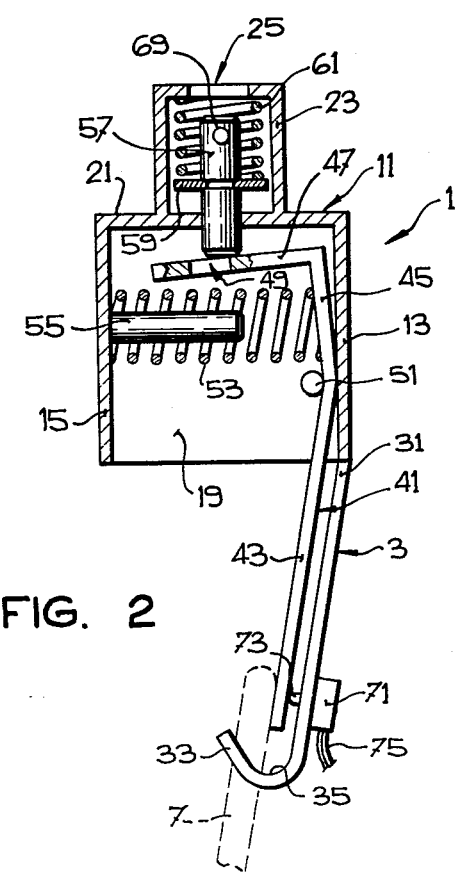
FIGS. 2 and 3 are cross-sectional, side elevational views of the support device shown in FIG. 1 without a fire extinguisher attached.
Figure 3:
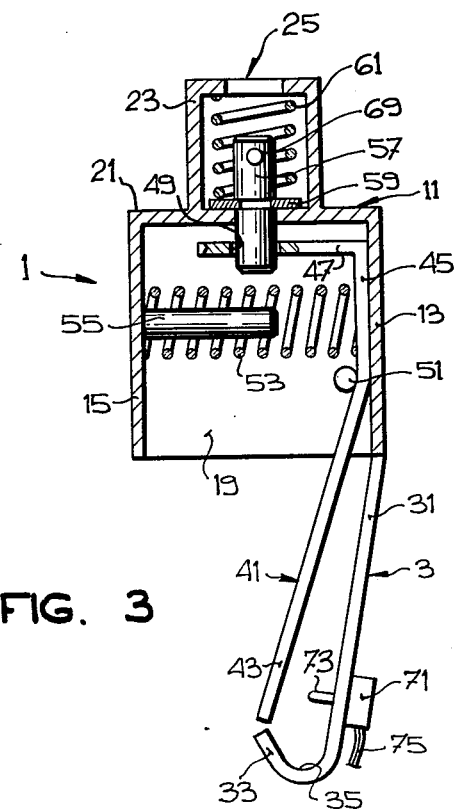
Figure 4:
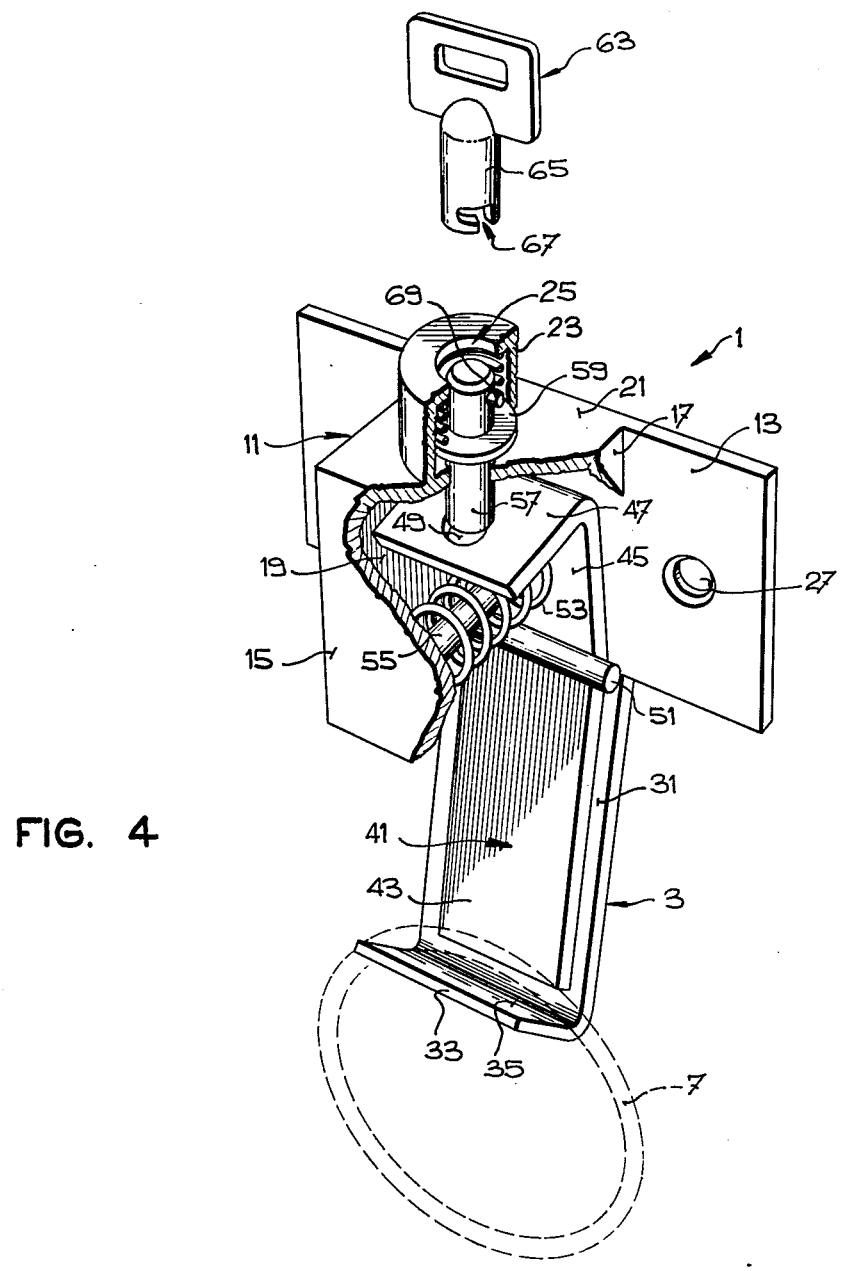
FIG. 4 is a perspective view in partial cross-section of the device shown in FIGS. 1 to 3.

Referring now on FIGS. 2, 3 and 4, the device 1 comprises a housing 11 forming an integral part of the hook 3. This housing 11 is in the shape of a substantially cubic box, the bottom of which is open and which includes a rear wall 13, a front wall 15, a pair of lateral walls 17 and 19 and a top 21. The top 21 is extended by means of another housing 23 which is smaller than the first. This other housing, which is cylindrical, is welded substantially onto the middle of the top 21 of the main housing 11. This other housing is provided on its upper surface with a hole 25 acting as a key hole, as will be described hereinafter in detail.

The rear wall 13 of the housing 11 has a much larger surface area than the front wall 15 so as to provide two lateral wings, each provided with a central hole 27 to permit the insertion of a pair of fixation screws 29 shown in FIG. 1. The rear wall 13 also integrally extends downwardly forming hook 3 which includes a first flat section 31 extending downwardly and forwardly at a slight angle with respect to the plane of the rear wall 13, and a second flat section 33 having the same width as the first section 31 but extending upwardly. Sections 31 and 33 of the hook 3 together define a groove 35 in which the ring 7 of the fire extinguisher 5 is inserted when the fire extinguisher is hung.

The essential feature of the above-described device 1 lies in that means are provided for preventing access to the hook as soon as the fire extinguisher is removed to prevent the fire extinguisher from being rehung.

The means for preventing access to the hook advantageously comprises a flat latch 41 mounted about a pin 51 extending parallel to the groove 35 of the hook 3 inside the housing 11. The pin 51 is fixed at its ends to the lateral walls 17 and 19 of the housing, close to the rear wall 13 thereof.

As shown in the drawings, the latch 41 comprises a first section 43 extending substantially along the entire length of the first section 31 of the hook 3. This first section 43 extends upwardly to the pin 51 and is of such a length that its lower end is in contact with the ring 7 of the fire extinguisher 5 when the same is hung, while being still movable without interfering with the upper edge of the second section 33 of the hook 3 when the latch 41 rotates about pin 51.

The latch 41 also includes a second section 45 integrally extending from the first section 43 on the upper side of the pin 51, inside the housing 11. The second section 45 is slightly inclined with respect to the plane of the first section 43 at such an angle that, when the second section 45 is in contact with the rear wall 13 of the housing 11, the first section 43 of the latch 41 is inclined forwardly at such an angle that its lower end moves almost to the edge of the second section 33 of the hook 3, as clearly shown in FIG. 3.

The latch 41 further comprises a third section 47 provided with a central hole 49, which third section integrally and perpendicularly extends from the upper edge of the second section 45 inside the housing 11.

Because of its structure, the latch 41 can pivot about pin 51 from a first position in which it is adjacent to the first section 31 of the hook 3 and completely frees the groove 35 thereof, to a second position in which it is separated from the first section of the hook 31 and prevents access to this hook by extending at an angle over the groove 35, thus closing it.

A pressure-spring 53 is mounted inside the housing 11 for permanently urging the second section 45 of the latch and pivoting it about pin 51 so that it moves to its second position as soon as the lower end of the first section 45 is no longer held by the ring 7 of the fire extinguisher. This spring 53 is advantageously coiled about a rod 55 welded to the middle of the internal surface of the front wall 15 of the housing 11. The only utility of this rod is to maintain the spring 53 inside the housing and prevent the spring from being removed or falling from its proper position.

In order to block the latch 41 as soon as it has been freed by removing the ring 7 of the fire extinguisher from the groove 35 of the hook 3, a small rod 57 is mounted inside the housing in such a manner that it engages a hole 49 provided in a third section 47 of the latch 41 to block the same as soon as it has moved forward to prevent access to hook 3 as shown on FIG. 3.

For this purpose, a blocking rod 57 is vertically mounted inside the small housing 23 and extends over the top 21 of the housing 11, and passes through the top 21 so as to reach and engage the hole 49 in the latch 41. A pressure-spring 61 is mounted inside the small housing 23 for permanently urging the blocking rod 57 via a flange 59 welded in its middle, and pushing it into engagement in the hole of the latch 41 as soon as this latch has reached the second position as shown in FIG. 3.

It should be noted that the flange 59 also acts as a retaining means for preventing the rod from falling inside the housing 11.

When the latch 41 is held by the ring 7 of the fire extinguisher, the lower end of the blocking rod 57 bears on the periphery of the hole 49 as shown on FIG. 2. As soon as the ring 7 is removed, the latch 41 is operated by the spring 53 and its rotation about pin 51 brings the hole 49 in front of the end of the rod 57 so that it is immediately pushed by its spring into positive engagement inside the hole. When engaged, the rod 57 prevents the latch 41 from being manually pushed back on rehanging the fire extinguisher by insertion of its ring 7 into the groove 35 of the hook 3. In order to allow the fire extinguisher 5 or another fire extinguisher to be rehung, a key 63 shown on FIG. 4 is provided. This key comprises a body 65 having a diameter slightly smaller than the diameter of the upper hole 25 in the small housing 23 so that it may engage therein. The lower end of the body 65 of the key 63 is provided with a pair of small L-shaped notches 67 designed to engage a pair of small pins 69 mounted in alignment with respect to each other on each side of the rod 57 close to the upper end thereof.

The key 63 allows the person responsible for the maintenance and/or safety of the building in which the fire extinguisher 5 is installed to release the latch 41 when the fire extinguisher 5 has been removed. For this purpose, the key 63 is inserted inside the hole 25 of the small housing 23 and is engaged with the two pins 69 of the blocking rod 57. The blocking rod 57 is then raised by the key 63 acting against the pressure exerted by the spring 61 until the lower end of the rod 57 has disengaged the hole 49 of the latch 47. Then, the lower end of the latch can be pushed by pressure against its spring 53 until the first section 43 thereof is in contact with the first section 31 of the hook 3 and thus frees the groove of the hook as shown in FIG. 2.

Advantageously, a micro-switch 71, provided with an activator 73, can be mounted on the hook 3 so as to emit or to switch off a signal as soon as the latch 41 moves from its usual position to the other position in which it prevents access to the groove 35. The microswitch 71 can be connected by a plurality of wires 75 to a control circuit that permits someone in charge of building safety to know immediately by either an alarm, a light, or both, when and where a fire extinguisher has been removed.

As can now be easily understood, the main advantage of the support device according to the invention lies in that the person who has removed the fire extinguisher and probably used it, cannot rehang it to the hook. This, of course, allows those in charge of the safety of the building to verify whether or not the fire extinguisher is full or empty and, therefore, must be filled again or can be rehung.

The support device 1 can be made of any suitable material such as steel.

What is claimed is:

1. A device for hanging a fire extinguisher, comprising:
   (a) a rigid hook upon which the fire extinguisher can be hung wherein the rigid hook has a groove therein upon which the fire extinguisher can be hung by means of a support ring attached thereto; and
   (b) means for preventing access to said hook as soon as the fire extinguisher is removed, so as to prevent the fire extinguisher from being rehung, wherein said means for preventing access to said hook comprises:
   a latch having a pair of ends;
   means for moving one end of said latch across said groove, thereby closing said groove as soon as the support ring is removed from said groove; and
   means for locking said latch as soon as said latch has moved across said groove.

2. A device according to claim 1, wherein said means for moving said latch comprises a spring bias means for pushing said one end across said groove as soon as the ring removed from said groove.

3. A device according to claim 2, wherein the ring, when hung on said hook, contacts said one end, thereby preventing movement of said latch across said groove.

4. A device according to claim 3, wherein said locking means comprises a rod held under pressure, said rod blocking said latch and preventing further movement of said latch as soon as said latch has moved across said groove.

5. A device according to claim 4, further comprising a key for removing said rod from blocking said latch, thereby allowing withdrawal of the latch from access said groove by pulling the latch against the pressure exerted by said spring bias means, enabling the fire extinguisher to be rehung.

6. A device according to claim 4, further comprising control means associated with said means for preventing access to said hook, said control means emitting a signal as soon as the fire extinguisher support ring is removed from said hook.

7. A device for hanging a fire extinguisher, comprising:
   (a) a rigid hook upon which the fire extinguisher can be hung, said hook having a downwardly extending portion and a generally upwardly extending portion forming a groove therebetween;
   (b) means for preventing access to said hook as soon as the fire extinguisher is removed, so as to prevent the fire extinguisher from being rehung, said means comprising:
   (c) a housing forming an integral part of said hook;
   (d) a pin in said housing;
   (e) a latch pivotally mounted about said pin, extending within said groove and being pivotable from a first position adjacent to said downwardly extending portion, thereby completely allowing access to said hook, to a second position extending over said groove and closing it, thereby preventing access to said hook, said latch having a length such that one of its ends contacts the support ring when the same is hung on the hook, thereby holding said latch in said first position;
   (f) a first pressure spring mounted inside said housing and continually urging said latch about said pin so that said latch moves to said second position as soon as said latch is no longer held in said first position by the ring;
   (g) a blocking rod mounted inside said housing and movable from a non-engaging position in which said rod is in contact with said latch, allowing rotation thereof, and is held by said latch in an engaging position in which said rod engages and blocks said latch, thereby preventing further rotation of said latch, said non-engaging and engaging positions of said rod corresponding to said first and second positions of said latch, respectively;
   (h) a second pressure spring mounted inside said housing permanently urging said blocking rod and moving it to said engaging position as soon as said latch has moved into said second position; and
   (i) a key for engaging said blocking rod so that said rod may be moved back to said non-engaging position, by pulling said rod against the pressure exerted by said second spring, the removal of said blocking rod thus allowing said latch to move back to said first position by applying an external pressure against the pressure exerted by said first spring, and thereby freeing said groove, thus enabling the fire extinguisher to be rehung.

8. A device according to claim 7, wherein said blocking rod engages a hole located near the other end of said latch when the fire extinguisher is hung.

* * * * *